(12) United States Patent
Tan

(10) Patent No.: US 11,106,080 B2
(45) Date of Patent: Aug. 31, 2021

(54) BACKLIGHT MODULE, DISPLAY DEVICE AND DRIVING METHOD FOR THE SAME

(71) Applicant: BOE TECHNOLOGY GROUP CO., LTD., Beijing (CN)

(72) Inventor: Jifeng Tan, Beijing (CN)

(73) Assignee: BOE TECHNOLOGY GROUP CO, LTD., Beijing (CN)

(*) Notice: Subject to any disclaimer, the term of this patent is extended or adjusted under 35 U.S.C. 154(b) by 0 days.

(21) Appl. No.: 16/199,451

(22) Filed: Nov. 26, 2018

(65) Prior Publication Data

US 2019/0302526 A1 Oct. 3, 2019

(30) Foreign Application Priority Data

Mar. 30, 2018 (CN) .......................... 201810295282.0

(51) Int. Cl.
| | |
|---|---|
| *G02F 1/1335* | (2006.01) |
| *G09G 3/36* | (2006.01) |
| *G02F 1/13357* | (2006.01) |
| *F21V 8/00* | (2006.01) |
| *G02F 1/133* | (2006.01) |

(52) U.S. Cl.
CPC ....... *G02F 1/133602* (2013.01); *G02B 6/003* (2013.01); *G02B 6/0016* (2013.01); *G02F 1/13306* (2013.01); *G02F 1/133509* (2013.01); *G09G 3/3611* (2013.01)

(58) Field of Classification Search
CPC combination set(s) only.
See application file for complete search history.

(56) References Cited

U.S. PATENT DOCUMENTS

| | | | | | |
|---|---|---|---|---|---|
| 5,575,549 | A | * | 11/1996 | Ishikawa | G02B 6/0025 |
| | | | | | 362/330 |
| 6,803,900 | B1 | * | 10/2004 | Berkoff | G02B 6/0028 |
| | | | | | 345/102 |
| 9,128,221 | B2 | * | 9/2015 | Shinohara | G02B 6/0038 |
| 9,678,264 | B2 | * | 6/2017 | Shinohara | G02B 6/002 |
| 2002/0154087 | A1 | * | 10/2002 | Katsu | G02B 6/0055 |
| | | | | | 345/102 |

(Continued)

FOREIGN PATENT DOCUMENTS

| | | |
|---|---|---|
| CN | 1573462 A | 2/2005 |
| CN | 107817629 A | 3/2018 |

(Continued)

OTHER PUBLICATIONS

First Office Action for Chinese Patent Application No. 201810295282.0 dated Mar. 23, 2020.

*Primary Examiner* — Benyam Ketema
(74) *Attorney, Agent, or Firm* — Calfee, Halter & Griswold LLP

(57) ABSTRACT

The present disclosure provides a backlight module, a display device and a driving method thereof. A backlight module of the present disclosure includes a light guide plate having a light-out side and a backlight side; a light source provided at one end of the light guide plate and includes a plurality of light emitting units having at least three different colors; and a light extracting layer comprising a plurality of light extracting gratings arranged in an array distribution on the light-out side or the backlight side for guiding the light to emit perpendicular to the light-out side.

10 Claims, 4 Drawing Sheets

(56) References Cited

U.S. PATENT DOCUMENTS

| | | | |
|---|---|---|---|
| 2003/0067436 A1* | 4/2003 | Hara | G09G 3/3406 |
| | | | 345/102 |
| 2004/0233534 A1* | 11/2004 | Nakanishi | G11B 7/123 |
| | | | 359/572 |
| 2005/0185133 A1* | 8/2005 | Winer | G02B 5/1809 |
| | | | 349/201 |
| 2006/0262079 A1* | 11/2006 | Seong | G09G 3/342 |
| | | | 345/102 |
| 2006/0285359 A1* | 12/2006 | Yang | G02B 6/0056 |
| | | | 362/615 |
| 2008/0025667 A1* | 1/2008 | Amitai | G02B 6/003 |
| | | | 385/36 |
| 2009/0091270 A1* | 4/2009 | Park | G02F 1/133603 |
| | | | 315/294 |
| 2009/0196068 A1* | 8/2009 | Wang | G02B 6/003 |
| | | | 362/608 |
| 2010/0182799 A1* | 7/2010 | Tanahashi | G02B 6/0046 |
| | | | 362/606 |
| 2012/0002441 A1* | 1/2012 | Yabe | G02F 1/133615 |
| | | | 362/607 |
| 2013/0044514 A1* | 2/2013 | Chang | G02B 6/0018 |
| | | | 362/609 |
| 2013/0141937 A1* | 6/2013 | Katsuta | G02B 6/003 |
| | | | 362/606 |
| 2016/0356939 A1* | 12/2016 | Wang | G02B 6/0021 |
| 2018/0329134 A1* | 11/2018 | Xu | G02F 1/133615 |

FOREIGN PATENT DOCUMENTS

| | | |
|---|---|---|
| CN | 110058347 A | 7/2019 |
| EP | 3136159 A1 | 3/2017 |

\* cited by examiner

US 11,106,080 B2

BACKLIGHT MODULE, DISPLAY DEVICE AND DRIVING METHOD FOR THE SAME

CROSS-REFERENCE TO RELATED APPLICATIONS

This application is based on and claims priority to Chinese Patent Application No. 201810295282.0, filed on Mar. 30, 2018, the contents of which are incorporated herein by reference in its entirety.

TECHNICAL FIELD

The present disclosure relates to the technical field of liquid crystal display (LCD), and more particularly, to a backlight module, a display device and a driving method for the display device.

BACKGROUND

With the evolution of optical technology and semiconductor technology, flat panel displays (FPD), represented by liquid crystal display, are widely used in the area of display. A liquid crystal display of the related art generally includes an array substrate, a color film substrate, a liquid crystal layer as well as a backlight module. The backlight module is configured for providing a light source for displaying, while the display patterns of the liquid crystal display are a result of a modulation to the backlight by the liquid crystal layer, so that the light transmittances of both the array substrate and the color film substrate can directly influence the effect of display. However, in the liquid crystal display of related art such light transmittance remains lower, and thus it is difficult to improve the effect of display.

It should be noted that the information disclosed in the section of BACKGROUND as presented above is only to strengthen understanding the background of the disclosure, so that it may involve the information that does not form a part of the related art known by those skilled in the art.

SUMMARY

According to an aspect of the present disclosure, there is provided a backlight module, the backlight module includes:
a light guide plate having a light-out side and a backlight side;
a light source provided at one end of the light guide plate and comprising a plurality of light emitting units having at least three different colors; and
a light extracting layer comprising a plurality of light extracting gratings arranged in an array distribution on the light-out side or the backlight side for guiding the light to emit perpendicular to the light-out side.

According to an aspect of the present disclosure, there is provided a display device, the display device includes a first substrate and a second substrate arranged opposite to each other, and a liquid crystal layer provided between the first and second substrates, the display device further includes:
a backlight module comprising:
a light guide plate having a light-out side and a backlight side;
a light source provided at one end of the light guide plate and comprising a plurality of light emitting units having at least three different colors; and
a light extracting layer comprising a plurality of light extracting gratings arranged in an array distribution on the light-out side or the backlight side for guiding the light to emit perpendicular to the light-out side.

the backlight module is arranged between the first substrate and the liquid crystal layer, with the backlight side being abutted to the first substrate, and the first substrate has a refractive index less than a refractive index of the light guide.

According to an aspect of the present disclosure, there is provided a driving method for driving a display device, the display device includes a first substrate and a second substrate arranged opposite to each other, and a liquid crystal layer provided between the first and second substrates, wherein the display device further includes:
a backlight module comprising:
a light guide plate having a light-out side and a backlight side;
a light source provided at one end of the light guide plate and comprising a plurality of light emitting units having at least three different colors; and
a light extracting layer comprising a plurality of light extracting gratings arranged in an array distribution on the light-out side or the backlight side for guiding the light to emit perpendicular to the light-out side;
the backlight module is arranged between the first substrate and the liquid crystal layer, with the backlight side being abutted to the first substrate, and the first substrate has a refractive index less than a refractive index of the light guide;
wherein the driving method comprises:
controlling each of the light emitting units of the light source to emit light one by one within a time of every frame.

It should be understood that the above general description and the following detailed description are merely illustrative and explanative, which may not be intended to restrict the disclosure.

BRIEF DESCRIPTION OF THE DRAWINGS

The accompanying drawings are incorporated in and constitute part of the specification, show the embodiments of the present disclosure and are intended to explain the principle of the present disclosure together with the description. It is apparent that the accompanying drawings in the following description are only some of the embodiments of the present disclosure, and other drawings may be obtained from these accompanying drawings by those skilled in the art without any creative work.

DETAILED DESCRIPTION

Figure 1:
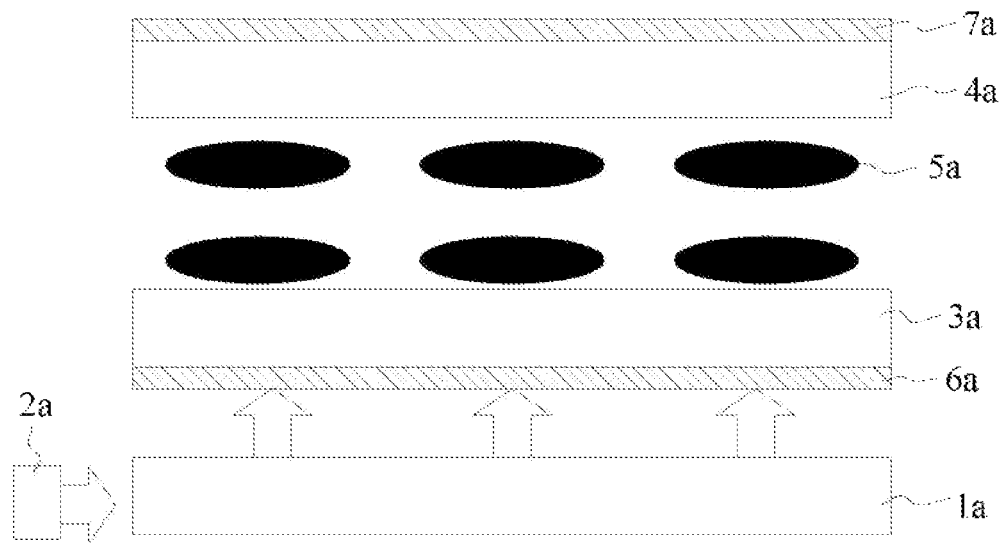
FIG. 1 is a schematic view of a display device in the related art.

Exemplary embodiments will now be described more fully with reference to the accompanying drawings. However, the example embodiments can be embodied in a variety of forms, and should not be construed as limitation of the examples set forth herein; instead, these embodiments are provided to make the present disclosure more comprehensive and complete, with fully conveying the conception of the exemplary embodiments to those skilled in the art. The same reference numbers in the drawing denote the same or similar structure, and the detailed description thereof is hereby omitted.

Although the specification use the terms of relativity, such as "above", "below" to indicate a position relationship of one component relative to another, these terms is used in the disclosure only for illustrative purposes, for example, in accordance with the direction depicted in the drawings. It would be understood that if the arrangement as shown is turned upside down, the component which is described as "above . . . " will become the component below. And when a certain structure is indicated as "above/on" other structure, it may mean that the structure is formed on other structure integrally, or the structure is provided on other structure directly, or provided on other structure "indirectly" through another structure.

The wordings "a", "one", "the", "said" and "at least a" is to indicate the presence of one or more element/component/ etc.; the wordings "include/comprise" and "have" is to indicate a non-exclusive meaning "include-in" and mean that other element/component/etc. may present except for those listed; and the wordings "first", "second" and "third" are used only as marks, without intending to limit the number of the object.

As shown in FIG. 1, which is a schematic view of a liquid crystal display device in the related art, the liquid crystal display device includes an array substrate 3a, a color film substrate 4a, a liquid crystal layer 5a and a backlight module, etc., the liquid crystal layer 5a is positioned between the array substrate 3a and the color film substrate 4a, and the backlight module includes a light guide plate 1a and a light source 2a, while the light guide plate 1a is positioned behind the array substrate 3a, and the light source 2a is positioned at a light-in side of the light guide plate 1a. Meanwhile, a first polarizer 6a is provided between the array substrate 3a and the light guide plate 1a, and a second polarizer 7a is provided at a surface of the color film substrate 4a away from the liquid crystal layer 5a. The color film substrate 4a has a black matrix and pixel units, these pixel units are consisted of color films. All of the first polarizer 6a, the second polarizer 7a and the color film may reduce the transmittance of the light, and thus influence the display effect.

Figure 4:
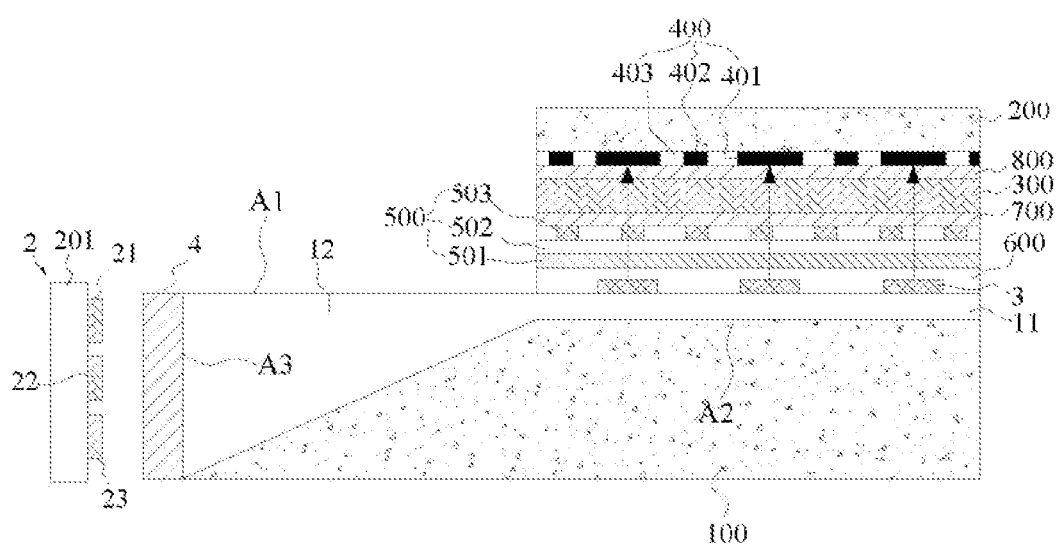
FIG. 4 is a schematic view of the display device in a dark state of an embodiment of the disclosure.
Figure 6:
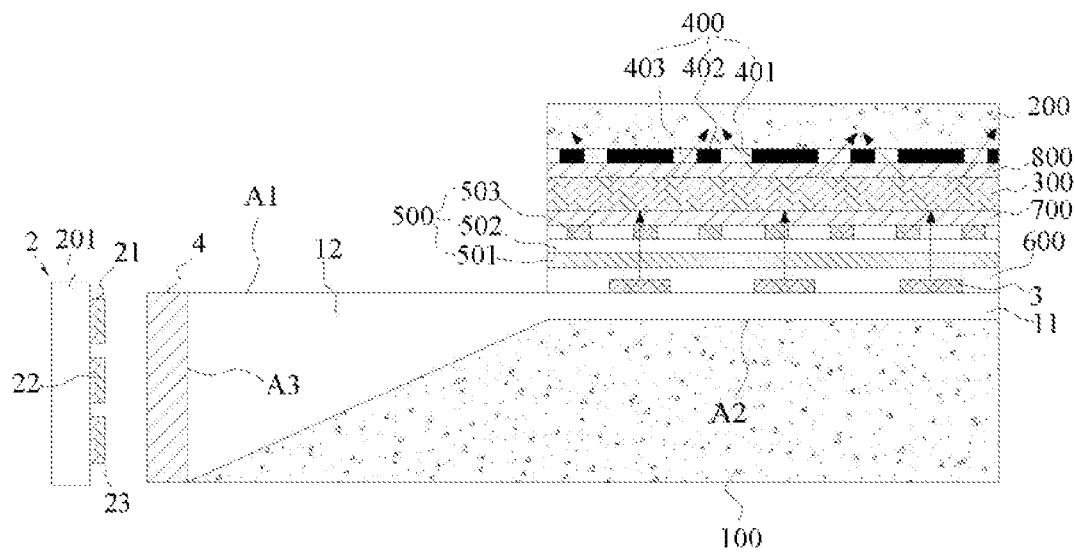
FIG. 6 is a schematic view of the display device in a bright state of an embodiment of the present disclosure.

The present exemplary embodiment provides a backlight module, which can be used in a display device, as shown in FIGS. 4 and 6, the display device may include a first substrate 100 and a second substrate 200 arranged opposite to each other, as well as a liquid crystal layer 300 positioned between the first and second substrate 100, 200.

Figure 2:
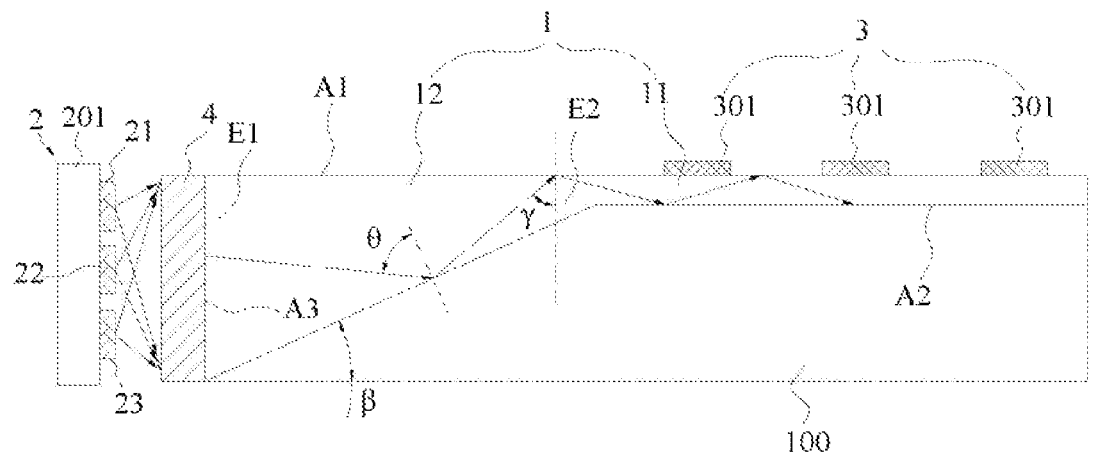
FIG. 2 is a schematic view of a backlight module of an embodiment of the present disclosure.

As shown in FIG. 2, a backlight module of an exemplary embodiment of the disclosure may include a light guide plate 1, a light source 2, a light extracting layer 3 and a light path adjusting element 4.

As shown in FIG. 2, in an embodiment, the light guide plate 1 may have a light-out side A1, a backlight side A2 and a plurality of surfaces, these surfaces surround the light-out side A1 and backlight side A2, and these surfaces include the light-in side A3, from which a light may enter the light guide plate 1, and emits from the light-out side A1. Meanwhile, as shown in FIGS. 4 and 6, in the display device, the light guide plate 1 may be arranged on the first substrate 100, and is positioned between the first substrate 100 and the second substrate 200.

The light guide plate 1 may include a light guiding part 11 and a wedge-shape part 12, the light guiding part 11 and the wedge-shape part 12 are configured in one-piece, in which: the light guiding part 11 may be a flat-plate configuration and may have a rectangle shape. The wedge-shape part 12 have a shape of trapezoid body, which has a big end E1 and a small end E2, in which the small end E2 can be engaged with one end of the light guiding part 11, and an end side of the big end E1 is the light-out side A3 of the light guide plate 1, such that the dimensions of the wedge-shape part 12 may expand outside gradually from the light guiding part 11. The top surfaces of the light guiding part 11 and the wedge-shape part 12 are positioned in one plane, which are joined together to form the light-out side A1 of the light guide plate 1; the bottom surface of the light guiding part 11 is parallel to the top surface thereof, the bottom surface of the wedge-shape part 12 is an oblique plane, that is, arranged obliquely relative to the bottom surface of the light guiding part 11, and is joined together with the bottom surface of the light guiding part 11 to form the backlight side A2 of the light guide plate 1.

As shown in FIG. 2, the light coming from the light-out side A3 of the light guide plate 1 may be incident onto the bottom surface of the wedge-shape part 12, and be reflected by the bottom surface to the light guiding part 11, which is beneficial to shorten the optical path of the light entered into the light guiding part 11. Accordingly, the light that enters into the above-mentioned light-out side A3 can be guided through the wedge-shape part 12 to transmit to the light guiding part 11.

In another embodiment of the disclosure, the light guide plate 1 may also be a flat-plate configuration having a cuboid shape, or may be other configurations, which will not be enumerated here. In addition, the backlight side A2 of the light guide plate 1 may also provide a reflecting layer (not shown) to prevent an emission of light from the backlight side A2.

As shown in FIG. 2, in an embodiment, the light source 2 may be arranged at one end of the light guide plate 1, just facing the light-out side A3 of the light guide plate 1, for emitting light to the light-out side A3. The light source 2 may include a circuit board 201 and light emitting units having three different colors on the circuit board 201, these light emitting units of various colors are arranged in sequence in a direction parallel to the light-out side A3, for instance, the light source 2 may include a first light emitting unit 21, the second light emitting unit 22 and the third light emitting unit 23, in which the first light emitting unit 21 may include a blue LED for emitting a blue light, the second light emitting unit 22 may include a green LED for emitting a green light, and the third light emitting unit 23 may include a red LED for emitting a red light. The number of LED included in each of the first light emitting unit 21, the second light emitting unit 22 and the third light emitting unit 23 may be one or more, and the LEDs having the same color are arranged in the same layer, that is, they are positioned in one and the same plane. Specifically, the LEDs of first light emitting unit 21 are positioned in a first straight line, the LEDs of the second light emitting unit 22 are positioned in a second straight line, and the LEDs of third light emitting unit 23 are positioned in a third straight line, while the first, second and third straight lines may be straight lines arranged from the light-out side A1 to the backlight side A2 in sequence and parallel to each other, with the straight lines being parallel to the out-light side A1. Meanwhile, the second light emitting unit 22 is positioned at a middle position between the first light emitting unit 21 and the third light emitting unit 23, that is, the distance between the second straight line and the first straight line is equal to the distance between the second straight line and the third straight line. Naturally, the LED may be replaced with other light emitting device.

In order to ensure all the light emitted by the light emitting unit to exit from the light extracting grating 301 with a collimating angle, for example, the wavelength of red light is relative large, and the wavelength of blue light is relative small, the red light can be made to have a relative small incident angle and the blue light can be made to have a relative large incident angle, by means of a reasonable selection for the cone angle β of the wedge-shape part 12, so as to achieve the result that the light emitted by the various of light emitting unit to exit with a collimating angle.

In another embodiment of the disclosure, the light source 2 may include four or more light emitting unit, and the color of the light emitted from the light emitting unit can be other colors, as long as the light emitted from the various of light emitting units have different colors.

As shown in FIG. 2, in an embodiment, light extracting layer 3 may be arranged the light-out side A1 of the light guide plate 1, and the light extracting layer 3 may include a plurality of light extracting grating 301, the plurality of light extracting grating 301 may be arranged in an array distribution on an area of the light-out side A1 corresponding to the light guiding part 11, and the light extracting grating 301 may not be provided on the wedge-shape part 12. With the light extracting grating 301, the light incident into light guide plate 1 can be extracted in a collimating angle, that is, exit in an angle perpendicular to the light-out side A1, so that the light incident into the light guide plate 1 can be modulated as a lattice beam to exit. The light extracting grating 301 can be a two-dimensional grating or a three-dimensional grating, as long as it can be used to extract the light in the light guide plate 1 in a collimating angle, and the configuration thereof is hereby not specifically limited.

Figure 8:
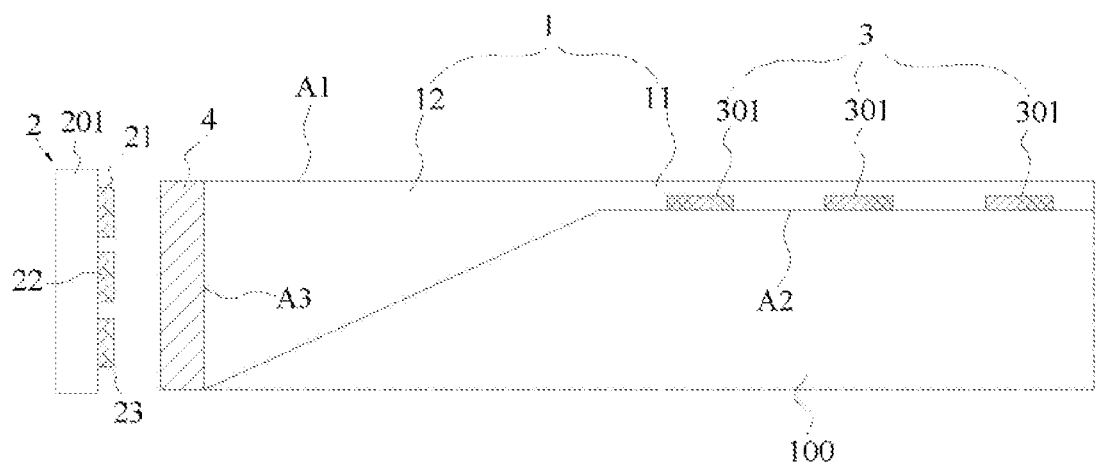
FIG. 8 is a schematic view of another embodiment of backlight module of the present disclosure.

In another embodiment of the disclosure, light extracting layer 3 may also be arranged on the backlight side A2 of the light guide plate 1. For example, as shown in FIG. 8, a plurality of light extracting grating 301 of the light extracting layer 3 are embedded into the backlight side A2 of the light guide plate, or they are formed directly on the backlight side A2 of the light guide plate 1, as long as they can be used to extract the light in the light guide plate 1 in a collimating angle.

As shown in FIG. 2, since a diffraction angle of m-order diffracted wave of the optical grating is merely determined by the optical grating period, the wavelength of incident wave and the incident angle, thereby the following formula can be obtained:

$$\sin\gamma - \sin\gamma' = m\lambda/P, (m=0,\pm1,\pm2\ldots);$$

in which P is the optical grating period, λ, is the wavelength of incident wave, γ' is the incident angle, γ is the included angle between the light and the normal of the light-out side A1 of the light guide plate. When the light extracting grating 301 emits a light beam in a collimating angle, that is, perpendicular to the light-out side A1 of the light guide plate 1, the α' is 0°, at this time, sin γ=mλ/P, and thereby the angle γ included between the light and the normal of the light-out side A1 of the light guide plate 1 can be calculate. Meanwhile, in order to reach a total reflection of light in the light guide plate 1, then γ≥γ0=arcsin (n2/n1), n1 is the refractive index of the light guide plate 1, and n2 is the refractive index of the first substrate 100. In addition, as shown in FIG. 2, in accordance with the Law of Light Reflection, it can be drawn that γ=θ−β, β is the cone angle of the first substrate 100, which equal to the cone angle of the wedge-shape part 12, and θ is an included angle between the incident light and the normal of the bottom surface of the wedge-shape part 12. On the basis of the qualifications mentioned above, the cone angle β can be determined, and thus the cone angle of the wedge-shape part 12, so as to determine the specific configuration of the wedge-shape part 12.

Figure 3:
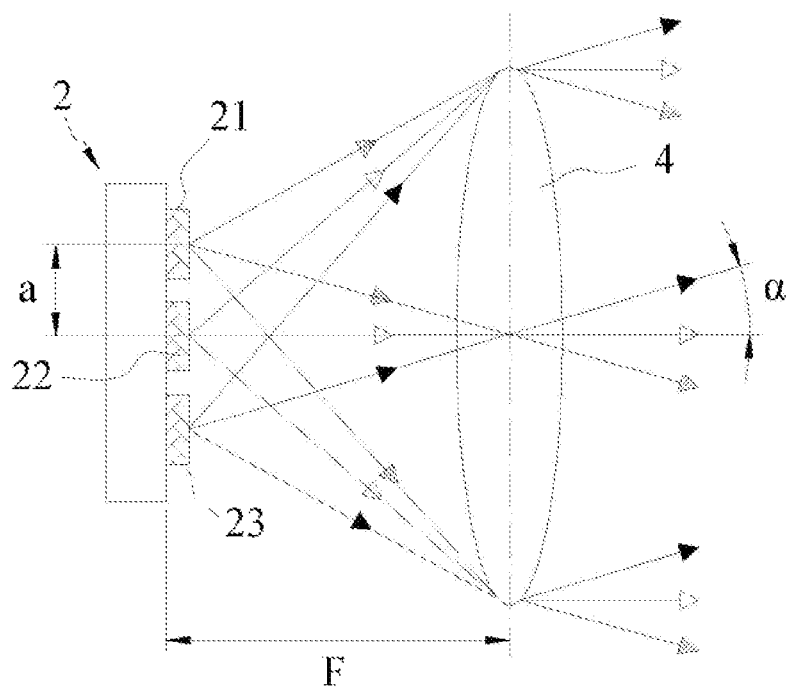
FIG. 3 is a schematic diagram of a light path adjusting element of the backlight module of an embodiment of the disclosure.

As shown in FIGS. 2-3, in an embodiment, light path adjusting element 4 can be a convex lens, which can be arranged between the light source 2 and light guide plate 1, and exactly face the big end E1 of the wedge-shape part 12, the light source 2 is positioned in the focus plane of the convex lens. For instance, the first light emitting unit 21, the second light emitting unit 22 and the third light emitting unit 23 are all positioned in the focus plane of the convex lens, and the plane on which the second light emitting unit 22 positioned intersect the optical axis of the convex lens, that is, the second light emitting unit 22 is positioned at the focus of the convex lens, the first light emitting unit 21 is positioned at a side of the second light emitting unit 22 close to the light-out side A1, and the third light emitting unit 23 is positioned at a side of the second light emitting unit 22 away from the light-out side A1, while the first light emitting unit 21 and the third light emitting unit 23 is symmetrical about the second light emitting unit 22.

The lights emitted from one and the same light emitting unit of the light source 2, after passing through the light path adjusting element 4, can be adjusted into a parallel state, thereby achieve a pre-collimation for the light emitted from the light source 2, so as to make the lights with different wavelength, different color and different angle irradiate the bottom surface of the wedge-shape part 12 and exit in a collimating angle.

As shown in FIG. 3, the included angle between the lights emitted from the two emitting unit after passing through the convex lens, can be adjusted by adjusting the positions of the light source 2 and the above-mentioned convex lens, so as to adjust the angle of the light entered into the light guide plate 1. In the light of the principle of the convex lens, the following formula can be obtained:

$$\tan\alpha = a/F;$$

in which α is the included angle between the light emitted from the two light emitting unit after passing through the convex lens, a is the distance between the two light emitting unit, and F is the focal distance of the convex lens.

In another embodiment of the disclosure, the light path adjusting element 4 may also be a Fresnel lens, a prism or an optical grating, etc., as long as that the same function as that of the convex lens as mentioned above can be presented as well, and the detailed description is hereby omitted.

An exemplary embodiment of the disclosure also provides a display device, as shown in FIGS. 4 and 6, the display device of the present embodiment may include a first substrate 100, a second substrate 200 and a liquid crystal layer 300, the first substrate 100 and the second substrate 200 are arranged opposite to each other, the liquid crystal layer 300 is positioned between the first and second substrates 100, 200. Meanwhile, the display device of the embodiment may also include a light filtering layer 400, an electrode layer 500, a planarization layer 600, a first orientation layer 700, a second orientation layer 800 and a backlight module of any of the above-mentioned embodiment.

As shown in FIGS. 4 and 6, in an embodiment, the light guide plate 1 of the backlight module may be arranged between the first substrate 100 and the liquid crystal layer 300, and the backlight side A2 of the light guide plate 1 may abut to the top surface of the first substrate 100, the first substrate 100 has a refractive index less than that of the light guide plate 1, so that the light can be total reflected on the backlight side A2 of the light guide plate 1. Meanwhile, the top surface of the first substrate 100 is matched with the backlight side A2 of the light guide plate 1 in shape and dimension, for example, light guide plate 1 is a trapezoid body in the above-mentioned embodiment of backlight module, the area of the top surface of the first substrate 100 corresponding to the bottom surface of the wedge-shape part 12 is also an oblique plane, so as to abut to the wedge-shape part 12.

As shown in FIGS. 4 and 6, in an embodiment, the light filtering layer 400 may be arranged between the liquid crystal layer 300 and the second substrate 200, and the light filtering layer 400 may include first light blocking parts 401, second light blocking parts 402 and sub-pixels 403, the number of the first light blocking parts 401, the second light blocking parts 402 and the sub-pixel 403 are more than one and they are arranged in an array distribution. For instance, one or more second light blocking part 402 may be provided between two adjacent first light blocking parts 401, and two adjacent sub-pixels 403 can be separated by the first light blocking part 401 or the second light blocking part 402.

The first light blocking part 401 and the second light blocking part 402 are all of opaque material, the sub-pixel 403 is of transparent material, and the orthographic projections of these first light blocking parts 401 on the light extracting layer 3 can cover each of the light extracting gratings 301 one by one, when the light emitted by the light extracting grating 301 reaches the first light blocking part 401, the light can be blocked by first light blocking part 401; when the light emitted from the light extracting grating 301 reaches the sub-pixel 403, the light can transmit through and exit the sub-pixel 403.

As shown in FIGS. 4 and 6, in an embodiment, an electrode layer 500 may be arranged between the backlight module and liquid crystal layer 300, and the electrode layer 500 may include a common electrode 501, an insulating layer 502 and a pixel electrode 503 stacked in sequence from the light guide plate 1 toward the liquid crystal layer 300, and also include a plurality of thin film transistors arranged in an array distribution, and grid lines, data lines etc. By controlling the thin film transistors, the pixel electrode 503 and the common electrode 501 can apply voltage to the liquid crystal layer 300, to adjust the direction and intensity of the light through the liquid crystal layer 300, thereby adjust the color and intensity of the light emitted from each sub-pixel 403, so as to get the result of displaying image. Naturally, the electrode layer 500 can also be another configuration, as long as the liquid crystal layer 300 can be controlled, and the detailed description thereof is thereby omitted.

For instance, as shown in FIG. 4, the liquid crystal layer 300 can be controlled to be in a first state by the electrode layer 500, in the first state the liquid crystal layer 300 can make the light emitted from light extracting grating 301 irradiate onto the respective first light blocking part 401 in a collimating angle, that is, irradiate vertically onto first light blocking part 401, at this time, the display device is in a dark state. As shown in FIG. 6, the liquid crystal layer 300 can also be controlled by the electrode layer 500 to be in a bright state, in the second state the liquid crystal layer 300 can change the direction of the light such that the light emitted from the extracting grating 301 exit from each of the sub-pixels 403, at this time, the display device is in a bright state.

As shown in FIGS. 4 and 6, in an embodiment of the disclosure the display device may also include a planarization layer 600, the planarization layer 600 may cover the light extracting layer 3, and fill the space between the light extracting gratings 301, and the planarization layer 600 has a refractive index less than that of the light guide plate 1, to ensure a total reflection in the light guide plate 1. Meanwhile, the refractive index of the planarization layer 600 may less that the refractive index of the light extracting layer 3 such that there is a difference of refractive index between the planarization layer 600 and light extracting layer 3, to ensure a diffraction effect of the light extracting layer 3 to the ray of light, and the larger difference of refractive index, the high diffraction efficiency of the light extracting layer 3 to the ray of light is. With the planarization layer 600, the height difference of the light extracting layers 3 can be eliminated, to obtain a planarization of light extracting layer 3, in order to facilitate arrangement of other configuration(s) above the light extracting layer 3.

As shown in FIGS. 4 and 6, in an embodiment the display device of the disclosure can also disclose a first orientation layer 700 and a second orientation layer 800, the first orientation layer 700 is positioned between the liquid crystal layer 300 and the electrode layer 500. The second orientation layer 800 is positioned between the liquid crystal layer 300 and the light filtering layer 400 between. With the first and second orientation layers 700, 800, the liquid crystal molecules of the liquid crystal layer 300 can be arranged orderly in a preset direction.

An exemplary embodiment of the disclosure also provides a driving method for a display device, configured for driving the display device of any of the above-mentioned embodiments, a driving method of the present embodiment may include step S110 to step S120.

In step S110, each light emitting unit of the light source 2 is controlled to emit light one by one within a time of every frame.

Figure 5:
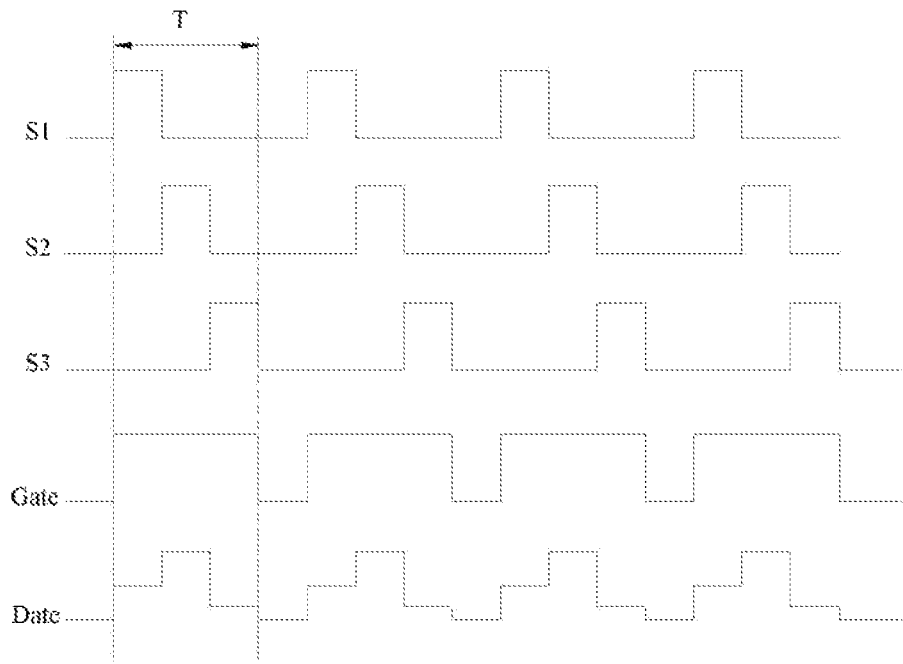
FIG. 5 is a signal sequence diagram of the display device in a dark state of an embodiment of the disclosure.
Figure 7:
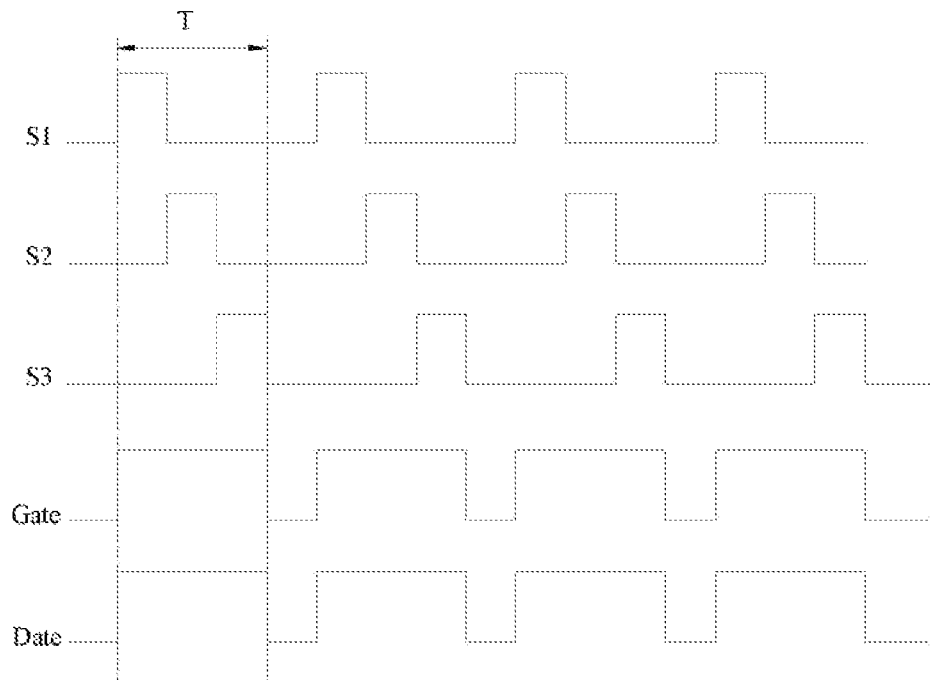
FIG. 7 is a signal sequence diagram of the display device in a bright state of an embodiment of the disclosure.

For instance, the light source 2 includes three light emitting units, that is, a first light emitting unit 21 to emit blue light, a second light emitting unit 22 to emit green light and a third light emitting unit 23 to emit red light. During the time of 1 frame, the three light emitting units may emit light one by one and they have the same light-emitting time, for example, the duration of ⅓ frame, that is, the three light emitting units can be input control signals in sequence, each control signal has a duration of ⅓ frame time. As shown in FIGS. 5 and 7, in FIGS. 5 and 7, T is the time of 1 frame, S1 denotes the control signal of the first light emitting unit, S2 denotes the control signal of the second light emitting unit 22, and S3 denotes the control signal of the third light emitting unit 23. Naturally, in the time of one frame, the light-emitting time of each of the light emitting unit may also less than ⅓ time of frame, or else, the light-emitting time of different light emitting unit may be difference as well.

Meanwhile, within every frame, each of the light emitting units may have the same luminous intensity. Naturally, the luminous intensity of different light emitting unit may be different as well.

In step S120, voltage is applied to the liquid crystal layer 300 via the electrode layer 500, to control the deflection of the liquid crystal molecules of liquid crystal layer 300, so as to change the color and intensity of the light emitted from the sub-pixel 403.

In an embodiment, a first electric field can be formed by means of the electrode layer 500, such that the light passing through the liquid crystal layer 300 is blocked by first light blocking part 401, to form a dark state. For instance, as shown in FIG. 4, the liquid crystal layer 300 can be provided under the first electric field, by inputting electric signal to the grid lines, data lines of the electrode layer 500, at this time the liquid crystal layer 300 is in a first state, and the light emitted from the light extracting grating 301 irradiate onto the first light blocking part 401 in a collimating angle, at this time, the light cannot be emitted from the sub-pixel 403, and the display device presents a dark state.

In another embodiment, a second electric field can be formed by a second electrode layer 500, the light passing through the liquid crystal layer 300 exit from the sub-pixel 403 and forms a dark state. For instance, As shown in FIG. 6, the liquid crystal layer 300 can be provided under the second electric field by inputting electric signal to the grid line, data line or the like of the electrode layer 500, at this time the liquid crystal layer 300 is in the second state, the light emitted from the light extracting grating 301 can exit from the sub-pixel 403, and the display device present a bright state. In the bright state, by the control of the deflection of the liquid crystal molecules, the intensity of the light emitted from the sub-pixel 403 can be adjusted; and, by the control of the moment of deflection of the liquid crystal molecules, the color of the light emitted from the sub-pixel 403 can be changed. Consequently, the color and gray level of the sub-pixel 403 can be adjustable, and the resolution is enlarged.

As shown in FIG. 5 and FIG. 7, for instance, within the time of 1 frame, each of the first, second and third light emitting units 21, 22 and 23 occupy the duration of ⅓ frame, respectively. Within the time of 1 frame, the first signal Gate is input to the electrode layer 500 grid line, the second signal Date is input to the data line, and the ratio of the signal intensity of the second signal Date in the first ⅓ frame, in the middle ⅓ frame and in the latter ⅓ frame is 3:6:1, at this time, the display device displays white light.

Alternatively, as shown in FIG. 7, the first signal Gate is in the same state as that shown in FIG. 5, and the intensity of the second signal Date is the same at 1 frame, so that the display device is in another display state. Accordingly, the display state of the display device can be controlled by adjusting the signal of the grid line and data line.

With the backlight module, the display device and the driving method of the display device of the embodiment of the present disclosure, since the light source 2 may include light emitting units with at least three different colors to emit light with three colors, the light entered into the guide plate 1 can be coupled out by the light extracting grating 301 of the light extracting layer 3, and exit vertically at the place where the light extracting grating 301 positioned, and that the backlight module can directly provide the light with various of colors by controlling the light emission sequence of the respective light emitting units, in conjunction with the control of the liquid crystal layer 300, the light provided by the backlight module is made to emit from the respective sub-pixel 403, and the color of the emergent ray of light of each sub-pixel 403 can be controlled, so as to achieve the image display. Accordingly, the light with at least three colors can be provided by the backlight module directly, so that the sub-pixels 403 are avoided from being formed by color films, and the polarizer is omitted, so as to improve the transmittance of light.

In addition, the color of the light emitting from each of the sub-pixels 403 can be switched between at least three colors, and that the resolution can be tripled in comparison with the sub-pixels 403 of the related art in which the color are not changed.

Other embodiments of the present disclosure will be apparent to those skilled in the art after reading the specification and implementing the invention disclosed herein. The present application is intended to cover any variations, purposes, or adaptations of the present disclosure, which are in accordance with the general principles of the present disclosure and include common general knowledge or conventional technical means in the art that are not disclosed in the present disclosure. The specification and embodiments are to be regarded as illustrative only, and the real scope and spirit of the present disclosure is defined by the attached claims.

What is claimed is:

1. A backlight module comprising:
    a light guide plate having a light-out side and a backlight side;
    a light source provided at one end of the light guide plate and comprising a plurality of light emitting units having at least three different colors;
    a light extracting layer comprising a plurality of light extracting gratings arranged in an array distribution on the light-out side or the backlight side for guiding the light to emit perpendicular to the light-out side; and
    a light path adjusting element provided between the light source and the light guide plate for adjusting the light emitted from the same light emitting unit into a parallel state;
    wherein the light path adjusting element is a convex lens and the light source is positioned at a focus plane of the convex lens;
    wherein the light extracting layer is arranged on the light-out side; the light guide plate comprises a light guiding part and a wedge-shape part between the light guide part and the light source, and the wedge-shape part has a small end connected with the light guide part and a big end facing the light source; and
    wherein both a top surface of the wedge-shape part and a top surface of the light guiding part are flat planes and are joined to form the light-out side; a bottom surface of the wedge-shape part is an oblique plane, the bottom surface of the light guiding part is a flat plane, and the two bottom surfaces are joined to form the backlight side,
    wherein the plurality of light extracting grating of the light extracting layer are embedded into the backlight side of the light guide plate, and are formed directly on the backlight side of the light guide plate.

2. The backlight module according to claim 1, wherein the light emitting unit comprises a first light emitting unit, a second light emitting unit and a third light emitting unit, arranged in sequence in a direction perpendicular to the light-out side of the light guide plate.

3. The backlight module according to claim 2, wherein the first light emitting unit is configured to emit blue light, the second light emitting unit is configured to emit green light, and the third light emitting unit is configured to emit red light; and
    the second light emitting unit is positioned at a focus of the light path adjusting element, the first light emitting unit is positioned on one side of the second emitting unit close to the light-out side, and the third light emitting unit and the first light emitting unit are arranged symmetrically about the second light emitting unit.

4. The backlight module according to claim 3, wherein the first light emitting unit comprises one or more blue LED, the second light emitting unit comprises one or more green LED, and the third light emitting unit comprises one or more red LED, while those LEDs emitting light of the same color are arranged in one straight line that is parallel to the light-out side of the backlight module.

5. A display device comprising a first substrate and a second substrate arranged opposite to each other, and a liquid crystal layer provided between the first and second substrates, wherein the display device further comprises:
 a backlight module comprising:
 a light guide plate having a light-out side and a backlight side;
 a light source provided at one end of the light guide plate and comprising a plurality of light emitting units having at least three different colors;
 a light extracting layer comprising a plurality of light extracting gratings arranged in an array distribution on the light-out side or the backlight side for guiding the light to emit perpendicular to the light-out side; and
 a light path adjusting element provided between the light source and the light guide plate for adjusting the light emitted from the same light emitting unit into a parallel state;
 wherein the light path adjusting element is a convex lens and the light source is positioned at a focus plane of the convex lens;
 wherein the light extracting layer is arranged on the light-out side; the light guide plate comprises a light guiding part and a wedge-shape part between the light guide part and the light source, and the wedge-shape part has a small end connected with the light guide part and a big end facing the light source; and
 wherein both a top surface of the wedge-shape part and a top surface of the light guiding part are flat planes and are joined to form the light-out side; a bottom surface of the wedge-shape part is an oblique plane, the bottom surface of the light guiding part is a flat plane, and the two bottom surfaces are joined to form the backlight side;
 the backlight module is arranged between the first substrate and the liquid crystal layer, with the backlight side being abutted to the first substrate, and the first substrate has a refractive index less than a refractive index of the light guide,
 wherein the backlight side of the light guide plate abuts to the top surface of the first substrate;
 wherein a light filtering layer provided between the liquid crystal layer and the second substrate, and the light filtering layer comprises a plurality of first light blocking parts, second light blocking parts and sub-pixels arranged in an array distribution, in which two adjacent sub-pixels are separated by the first light blocking parts or the second light blocking parts, the sub-pixels are transparent structure, and an orthographic projection of the first light blocking parts on the light extracting layer covers the light extracting grating; and
 wherein a planarization layer covering the light extracting layer, the planarization layer has a refractive index different from a refractive index of the light extracting layer, and the refractive index of the planarization layer is less than the refractive index of the light guide plate.

6. The display device according to claim 5, wherein the display device further comprises a electrode layer provided between the backlight module and the liquid crystal layer, which is configured to apply a voltage to the liquid crystal layer to control an eccentric rotation of liquid crystal molecules.

7. The display device according to claim 5, wherein the electrode layer comprises a plurality of thin film transistors arranged in an array distribution, a pixel electrode and a common electrode connected with the thin film transistors, while the thin film transistors and the pixel electrodes face each other one by one.

8. The display device according to claim 5, wherein the display device further comprises:
 a first orientation layer provided between the liquid crystal layer and the electrode layer; and
 a second orientation layer provided between the liquid crystal layer and the light filtering layer.

9. A driving method for a display device, in which the display device comprises a first substrate and a second substrate arranged opposite to each other, and a liquid crystal layer provided between the first and second substrates, wherein the display device further comprises:
 a backlight module comprising:
 a light guide plate having a light-out side and a backlight side;
 a light source provided at one end of the light guide plate and comprising a plurality of light emitting units having at least three different colors; and
 a light extracting layer comprising a plurality of light extracting gratings arranged in an array distribution on the light-out side or the backlight side for guiding the light to emit perpendicular to the light-out side; and
 a light path adjusting element provided between the light source and the light guide plate for adjusting the light emitted from the same light emitting unit into a parallel state;
 wherein the light path adjusting element is a convex lens and the light source is positioned at a focus plane of the convex lens;
 wherein the light extracting layer is arranged on the light-out side; the light guide plate comprises a light guiding part and a wedge-shape part between the light guide part and the light source, and the wedge-shape part has a small end connected with the light guide part and a big end facing the light source; and
  wherein both a top surface of the wedge-shape part and a top surface of the light guiding part are flat planes and are joined to form the light-out side; a bottom surface of the wedge-shape part is an oblique plane, the bottom surface of the light guiding part is a flat plane, and the two bottom surfaces are joined to form the backlight side;
 the backlight module is arranged between the first substrate and the liquid crystal layer, with the backlight side being abutted to the first substrate, and the first substrate has a refractive index less than a refractive index of the light guide;
 wherein the driving method comprises:
 controlling each of the light emitting units of the light source to emit light one by one within a time of every frame.

10. The driving method according to claim 9, wherein the luminous intensity and/or the illumination time of each of the light emitting units is controlled to be identical.

\* \* \* \* \*